Patented Nov. 21, 1933

1,936,265

UNITED STATES PATENT OFFICE 1,936,265

SULPHONATED HIGHER FATTY ACID ESTERS

Alfred Rheiner and Jakob Link, Basel, Switzerland, assignors to the firm of Chemical Works formerly Sandoz, Basel, Switzerland No Drawing. Application November 24, 1931, Serial No. 577,156, and in Switzerland December 5, 1930

4 Claims. (Cl. 260—106)

It is known that the sulphuric acid esters obtained from the alkyl esters of the fatty acids of a higher molecular weight are good cleaning and emulsifying agents and possess further an excellent wetting-out action and a good stability towards the calcium salts. They are, therefore, different in their most important properties from the sulphated glycerides of the higher fatty acids, which also possess similar properties, but which are much less active, probably because they contain free hydroxylic groups.

A very important difference is therefore observed between these two series of derivatives.

We have now found that the products obtained by treating with sulphuric acid such esters which consist of fatty acids of a higher molecular weight and of such derivatives of polyhydric alcohols, as for instance glycol and glycerine, in which the hydroxylic groups are completely or partly replaced by halogen, oxyalkyl, oxyaryl, oxyaralkyl or carboxyalkyl groups, possess very valuable wetting, cleaning and emulsifying properties.

Several methods may be used for the preparation of these compounds. It is possible to preliminarily esterify the fatty acids with such glycol- and glycerine compounds that contain at least one free hydroxylic group and to treat the esters thus obtained with sulphuric acid under such conditions that no saponification occurs. Or it is also possible to treat with sulphuric acid the free fatty acids and to esterify the products obtained by means of the above mentioned glycol and glycerine derivatives. It is further possible to carry out the treatment with sulphuric acid and the esterifying operations at the same time. Or, instead of using the free fatty acids, their glycol and glycerine esters may be used and be transformed before, during or after the treatment with sulphuric acid into the desired compounds by an alcoholysis with glycol- and glycerine derivatives, containing at least one free hydroxylic group.

It is also possible to treat with suitable alkylating, arylating or aralkylating agents before or after sulphation such glycerine derivatives partly esterified with fatty acids that contain at least one free hydroxylic group, like the mono-oleic acid glycerine ester, and to prepare in this way valuable wetting, cleaning and emulsifying agents.

The products prepared according to the processes described above are, in the form of their free sulphuric acid esters or their alkali metal salts, easily water-soluble compounds, which possess excellent wetting, cleansing and emulsifying properties. They possess further the remarkable property of transforming water-insoluble, or difficultly soluble, compounds into stable emulsions or solutions and may, therefore, advantageously be used in the textile, paper, leather and other allied industries.

The following examples illustrate the manufacture of the products according to the invention.

Example 1

Into 340 parts of the oleic acid ester of monoethylether of glycol of the formula

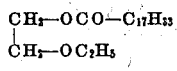

there are introduced at a temperature of from −5 to +8° C., while well stirring, 210 parts of concentrated sulphuric acid (monohydrate), and the mixture is left to stand until the whole mass becomes soluble in water. The obtained mass is then poured into ice water, decanted and the sulphuric acid esters transformed by neutralizing it with sodium carbonate into its alkali metal salt, which possesses an excellent wetting-out power.

The respective quantities of the compounds cited above may be varied within wide limits, but it is preferable to work at low temperature in order to avoid the saponification of the ester. Instead of the oleic acid esters, esters of the fatty acids such as ricinoleic- and hydroxystearic acids may be subjected to such a treatment, and instead of ethyl glycolester, esters of halogenated, alkylated, arylated and aralkylated glycols and glycerine may be used.

Example 2

46 parts of oleic acid ester of α-glycerine-monoxylylether of the formula:

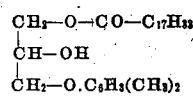

are treated with 30 parts of sulphuric acid in the manner described in the Example 1 and the water-soluble sulphuric acid ester obtained is worked up in the usual manner. The sodium salt of the product thus prepared possesses a much stronger emulsifying and wetting-out power and a better stability towards the calcium salts when compared with a product obtained by sulphonating olive oil.

*Example 3*

59 parts of the oleic acid ester of commercial glycerine-dichlorhydrine are treated with 30 parts of sulphuric acid of 100% strength in the same manner as described in the Example 1. The sulphuric acid ester thus obtained possesses good emulsifying and wetting-out properties.

*Example 4*

85 parts of the oleic acid ester of diethylene glycolmonobutyl ether of the formula:

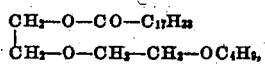

are treated at a temperature of from −5 to +5° C. with 45 parts of concentrated sulphuric acid (monohydrate) and worked up as described in Example 1. In this manner a product with good wetting properties is obtained.

If the oleic acid ester used in this example is replaced by an equivalent quantity of oleic acid ester of ethyleneglycol is isopropylether a similar product is obtained.

*Example 5*

56 parts of oleic acid ester of glycerine-monochlorhydrine are treated at 0–10° C., with 50 parts of concentrated sulphuric acid (100% conc.) and worked up as above described. A good wetting-out agent is obtained in this manner.

What we claim is:—

1. The sulphuric acid esters of oelic acid, esterified with polyhydric alcohols in which at least one hydroxy group is replaced by a halogen, oxyalkyl- or oxyaryl-group of the benzene series, which are in form of their free sulphuric acid esters or their alkali metal salts easily water soluble compounds, possessing excellent wetting, cleansing and emulsifying properties and which can be used for transforming water-insoluble or difficultly soluble compounds into stable emulsions or solutions.

2. The sulphuric acid ester of oleic acid ester of glycolmonoethylether, which is in form of its free sulphuric acid ester or its alkali metal salt an easily water soluble compound, possessing excellent wetting, cleansing and emulsifying properties and which can be used for transforming water insoluble or difficultly soluble compounds into stable emulsions or solutions.

3. The sulphuric acid ester of oleic acid ester of ethylene-glycolmonoisopropylether, which is in form of its free sulphuric acid ester or its alkali metal salt an easily water soluble compound, possessing excellent wetting, cleansing and emulsifying properties and which can be used for transforming water-insoluble or difficultly soluble compounds into stable emulsions or solutions.

4. The sulphuric acid ester of oleic acid ester of diethyleneglycolmonobutylether, which is in form of its free sulphuric acid ester or its alkali metal salt an easily water soluble compound, possessing excellent wetting, cleansing and emulsifying properties and which can be used for transforming water-insoluble or difficultly soluble compounds into stable emulsions or solutions.

ALFRED RHEINER.
JAKOB LINK.